United States Patent

Tsuchiya et al.

[11] 4,317,753
[45] Mar. 2, 1982

[54] OFFSET INK COMPOSITIONS

[75] Inventors: Shozo Tsuchiya, Tokyo; Makoto Sasaki; Hideo Hayashi, both of Yokohama, all of Japan

[73] Assignee: Nippon Oil Co., Ltd., Japan

[21] Appl. No.: 179,696

[22] Filed: Aug. 20, 1980

[30] Foreign Application Priority Data

Aug. 23, 1979 [JP] Japan .................... 54-106607

[51] Int. Cl.$^3$ ............................................. C08L 61/10
[52] U.S. Cl. ...................... 524/504; 525/68; 525/139; 525/140; 525/141; 526/283; 526/282; 525/289
[58] Field of Search .............. 260/19 UA, 23.7 C; 526/283, 282; 525/68, 139, 140, 141

[56] References Cited

U.S. PATENT DOCUMENTS

| | | | |
|---|---|---|---|
| 3,887,641 | 6/1975 | Tsuchiya | 525/68 |
| 3,984,381 | 10/1976 | Tsuchiya | 526/283 |
| 4,056,498 | 11/1977 | Laurito | 260/23.7 C |
| 4,139,500 | 2/1979 | Rudolphy | 260/19 UA |

*Primary Examiner*—Paul R. Michl
*Attorney, Agent, or Firm*—Ostrolenk, Faber, Gerb & Soffen

[57] ABSTRACT

Offset ink compositions are disclosed which contain as a vehicle a resin (III) obtainable by the steps of:

(a) copolymerizing 100 parts by weight of a five-membered ring compound having a conjugated double bond, represented by the general formula:

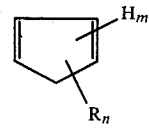

(wherein H is hydrogen, R is an alkyl group having 1 to 3 carbon atoms, and m and n are each 0 or an integer of 1 or more such that $m+n=6$) and/or a Diels-Alder addition product of said five-membered ring compound (Component A), with 10 to 150 parts by weight of a codimer (Component B) of said five-membered ring compound and 1,3-butadiene;

(b) reacting 100 parts by weight of the resulting hydrocarbon resin (I) with 1 to 15 parts by weight of an unsaturated carboxylic acid or an anhydride thereof (Component C); and (c) reacting at elevated temperatures 100 parts by weight of the resulting acid-modified resin (II) with 5 to 100 parts by weight of a phenol resin (Component D) obtainable by the condensation of a phenol with formalin.

42 Claims, No Drawings

OFFSET INK COMPOSITIONS

BACKGROUND OF THE INVENTION

1. Field of the Invention

The present invention relates to varnish compositions for use in offset printing inks.

2. Brief Description of the Prior Art

As general processes of printing, there have currently been extensively used relief printing, lithography (for example, offset printing or the like) and photogravure. Of these printing processes, the offset printing process comprises transferring inked images from a printing plate roll to a rubber blanket and printing the images on paper. The printing plate roll is provided with a non-image portion (a water retentive portion) bearing water and receiving no oil and an image portion (an inking portion) bearing the ink and repelling water.

Offset printing inks may usually be prepared by adding pigments to resinous varnishes comprising resins, solvents, drying oils such as linseed oil, and other additives.

The resinous varnishes for use in offset printing must have the following basic properties:

(1) In order to form images on a flat surface by keeping the ink in contact with water, they should maintain a surface balance between the water retentive portion and the inking portion;

(2) they should possess appropriate flowability as indicated by viscosity and yield value;

(3) they should exhibit good dispersibility with pigments;

(4) they should provide gloss and uniform impressions on the printed surface;

(5) they should quickly set and dry without causing blocking; and (6) they should provide printed surfaces having good anti-friction property.

In order to satisfy the above properties required for the resinous varnishes for offset printing inks, the resins for use in the varnishes must meet the following requirements:

(1) they should have sufficient solubility in a high boiling point hydrocarbon solvent to be used for offset inks which have no aromatic content or a low aromatic content;

(2) they should have sufficient solubility in a drying oil such as linseed oil;

(3) they should have a high softening point, but not a high molecular weight; and (4) they should have a polar group having pigment dispersibility (a polar group having good compatibility with the pigment).

As varnishes for printing ink, there have currently been used resinous varnishes prepared by dissolving a resin such as an alkylphenol resin, a rosin-modified phenol or a maleic acid resin in a drying oil such as linseed oil. Of these, the rosin-modified phenol resin has been most frequently used. A vehicle for printing ink, which comprises the rosin-modified phenol resin, a solvent and/or drying oil is excellent in quality; however, it has disadvantages in that the supply of rosin is not stable and its price is high because it is a naturally occurring substance. On the other hand, a so-called petroleum-derived resin which may be obtained by polymerizing cracked oil fractions in great quantities as by-products in petroleum or petrochemical industry, can offer advantages in that it can be constantly supplied and its price is stable; however, its quality is not satisfactory. Resins capable of being used as resins for printing ink have been little obtained from petroleum-derived resins.

It is disclosed in U.S. Pat. No. 3,084,147 that a resin soluble in a hydrocarbon solvent is obtained by thermally polymerizing dicyclopentadiene in the presence of an inert hydrocarbon solvent at a temperature of 250°–350° C. The dicyclopentadiene resin thus obtained cannot be utilized effectively for various uses because of its poor compatibility with and adherence to a variety of substances due to its lack of polar groups. An ink prepared from this resin by the addition thereto of various solvents and pigments is poor in dispersibility with the pigments and in its ability to stick to the printing material and provide gloss on printed surfaces, and it cannot provide a uniform printed surface. Accordingly, it cannot be used as a resin for offset printing inks.

Attempts have been made to provide a resin for use in the preparation of printing ink by adding an acrylic acid ester, maleic acid anhydride or the like to the above-mentioned dicyclopentadiene resin, hydrolyzing the mixture to give a carboxylic acid-containing resin, and then reacting the resulting resin with a polyhydric alcohol and a higher unsaturated aliphatic acid (Japanese Patent Public Disclosure No. 24,405/1972). An offset printing ink prepared from this resin may show decreased flowability and gloss on printed surfaces because of decreased solubility in petroleum-derived hydrocarbon solvents when the softening point of the base resin is elevated to bring its setting and drying times at printing to the same values conventional inks exhibit. This resin causes gelation and turbidity in the preparation of the varnish and gives an undesirable hue to the varnish. In order to improve its solubility in ink solvents, the resin must have a lower softening point. Accordingly, its setting and drying times become so long that it is no longer practical.

A resin obtained by thermally copolymerizing cyclopentadiene with maleic anhydride is disclosed in U.S. Pat. No. 2,608,550. This resin, when the amount of the maleic anhydride is lessened, usually exhibits an unfavorable elevation in its softening point and provides poor dispersibility with pigments and poor compatibility with other fillers; when maleic anhydride is added in larger amounts to improve these properties, the resin is apt to cause coloring and gelation, and its weather resistance is degraded.

It is further disclosed in U.S. Pat. No. 2,608,550 that a resin useful for ink is prepared by so-called alkyd modification comprising reacting a resin prepared by thermal polymerization of dicyclopentadiene with maleic anhydride, as a polybasic acid component, with a polyhydric alcohol and a drying oil. Since the alkyd resins thus prepared usually have high molecular weights, they have poor solubility in a high boiling point hydrocarbon solvent and a drying oil for use in ink. Thus, when formulated into an ink, the ink exhibits poor flowability and inferior gloss on the printed surface. Furthermore, the ink tends to disperse in a mist (so-called "misting"), thereby staining the printing paper so that it cannot be practically used.

In every case mentioned hereinabove, those resins are very poor in solubility in paraffinic solvents so that they are not applicable whatsoever to offset inks where a paraffinic solvent is used.

In order to provide offset ink compositions which are improved in the various properties referred to hereinabove, we have previously proposed offset ink compositions containing as vehicles resins obtainable by preparing a hydrocarbon resin by copolymerizing a particular five-membered ring compound having a conjugated double bond and/or a Diels-Alder addition product of the above five-membered ring compound with at least one component selected from the group consisting of turpentine oil, diisobutylene and nonene; reacting the hydrocarbon resin with an unsaturated carboxylic acid or an anhydride thereof to produce an acid-modified resin; and then thermally reacting the acid-modified resin with a phenol resin obtainable by condensation of a phenol having an alkyl group having 4 to 9 carbon atoms with formalin (Japanese Patent Application No. 131,665/1978).

We further proposed novel varnish compositions for use in offset inks, containing (a) a resin obtainable by reacting a hydrocarbon resin obtained by polymerizing a particular five-membered ring compound having a conjugated double bond and/or Diels-Alder addition product thereof with an unsaturated carboxylic acid and/or an anhydride thereof to provide an acid-modified resin, additionally reacting the resulting acid-modified resin with a higher saturated or unsaturated monohydric alcohol having 6 or more carbon atoms to yield an esterified resin, and then reacting the esterified resin with a phenol resin obtainable by reacting a phenol having an alkyl substituent having 4 to 9 carbon atoms with formalin; (b) a hydrocarbon solvent containing an aromatic content of less than 50% by weight and having a boiling point between 200° C. and 350° C.; and (c) drying oil (Japanese Patent Application No. 128/1979).

SUMMARY OF THE INVENTION

Accordingly, the object of the present invention is to provide varnish compositions for use in offset inks, capable of offering the above-mentioned various characteristics required for offset inks.

Another object of the present invention is to provide varnish compositions for offset inks, using resins having properties improved over those of prior art resins.

A further object of the present invention is to provide varnish compositions for use in offset inks, using resins which are obtainable at less cost and in greater quantities from raw materials obtained as by-products in the petrochemical industry and which are acceptable substitutes for rosin-modified phenol resins.

DETAILED DESCRIPTION OF THE INVENTION

The offset ink compositions according to the present invention satisfy the above-mentioned objects and have performance identical with or better than those of the inventions claimed in the two patent applications referred to hereinabove.

The offset ink compositions according to the present invention contain as a vehicle, a resin (III) which is obtained by copolymerizing 100 parts by weight of a five-membered ring compound having a conjugated double bond, represented by the general formula:

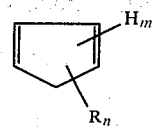

(wherein H is hydrogen, R is an alkyl group having 1 to 3 carbon atoms, and m and n are each 0 or an integer of 1 or more such that $m+n=6$) and/or a Diels-Alder addition product of the five-membered ring compound (Component A), with 10 to 150 parts by weight of a codimer (Component B) of the five-membered ring compound and 1,3-butadiene to yield a hydrocarbon resin (I); reacting 100 parts by weight of the hydrocarbon resin (I) with 1 to 15 parts by weight of an unsaturated carboxylic acid or an anhydride thereof (Component C) to yield an acid-modified resin (II), and thermally reacting 100 parts by weight of the acid-modified resin (II) with 5 to 100 parts by weight of a phenol resin (Component D) obtainable by the condensation of a phenol and formalin.

The compositions according to the present invention will be described below in more detail.

The present invention employs as a raw material component (Component A) a five-membered ring compound having a conjugated double bond, represented by the following general formula:

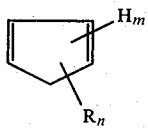

(wherein H is hydrogen, R is an alkyl group having 1 to 3 carbon atoms, and m and n are each 0 or an integer of 1 or more such that $m+n=6$) or its Diels-Alder addition product.

Specifically, the five-membered ring compounds may include, for example, cyclopentadiene and methylcyclopentadiene, and its Diels-Alder addition products may include, for example, dicyclopentadiene, cyclopentadiene-methylcyclopentadiene codimer and tricyclopentadiene. A mixture thereof may be preferably employed on an industrial scale. Among these, cyclopentadiene, dicyclopentadiene or a mixture thereof is preferred.

Although a higher purity of Component A is not always necessary, it is preferred that cyclopentadiene, dicyclopentadiene or an alkyl-substituted derivative thereof be present in the amount of 80% by weight or higher. For example, there may be employed a condensed fraction obtainable by the removal by distillation of a majority of $C_5$ components such as $C_5$ olefins, $C_5$ paraffins or the like from a mixture of dicyclopentadiene, dimethylcyclopentadiene, cyclopentadiene-methylcyclopentadiene codimer, cyclopentadiene-isoprene codimer, cyclopentadiene-piperylene codimer or the like obtainable by the thermal dimerization of cyclopentadiene and methylcyclopentadiene contained in $C_5$ fractions produced by high temperature cracking of oil by-products such as naphtha.

It is also possible to employ in Component A a mixture of an unsaturated component of petroleum fractions, particularly an unsaturated aromatic component, with the five-membered ring compound and/or the Diels-Alder addition thereof in an amount equal to or less than the molar amount of the latter. For example, styrene, α-methylstyrene, vinyltoluene, indene, methylindene and a mixture thereof may be used. So-called C₉ fractions by-produced at the time of cracking of naphtha and the like are preferred industrially.

The Component B to be employed in the present invention is a codimer of a five-membered ring compound having a conjugated double bond, represented by the following general formula:

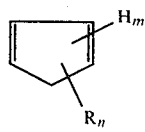

(wherein H is hydrogen, R is an alkyl group having 1 to 3 carbon atoms, and m and n are each 0 or an integer of 1 or more such that m+n=6) and 1,3-butadiene. Specifically, it may include tetrahydroindene, vinylnorbornene or a substituted derivative thereof, which are all codimers of cyclopentadiene and 1,3-butadiene. A mixture of these may also be used. If a dimer of 1,3-butadiene is present in a small amount as a by-product in the manufacture of the Component B, the codimer of the five-membered ring compound with a conjugated double bond and 1,3-butadiene, it may also be employed.

In accordance with the present invention, the hydrocarbon resin (I) may be prepared by reacting 10 to 150 parts by weight, preferably 20 to 100 parts by weight, of Component B with 100 parts by weight of the above Component A in the presence or absence of a catalyst. When the reaction is carried out without a catalyst, the hydrocarbon resin (I) may be prepared by heating a mixture of the above Components A and B at 200° to 300° C. for 30 minutes to 15 hours, preferably from 1 to 7 hours. On the other hand, a catalyst, including a Friedel-Crafts catalyst, for example, boron trifluoride; its complex with phenol, ether, acetic acid or the like; or aluminum chloride or the like; may be employed in an amount between 0.1 and 10% by weight, and preferably between 0.3 and 2% by weight with respect to the total monomer weight. When the reaction is carried out in the presence of a catalyst, the reaction conditions may be: a reaction temperature from −30° to 100° C., preferably from 0° to 50° C., and a reaction time from 10 minutes to 20 hours, preferably from 1 to 15 hours.

In the manufacture of the hydrocarbon resin (I) to be employed in accordance with the present invention, when the amount of Component B is below the above range, the acid-modified resin (III) resulting from modification of this resin has inadequate solubility in paraffinic solvents so that it cannot be used for the major purpose of the present invention, which is for use in inks for offset printing where a paraffinic solvent is employed. When the amount of Component B exceeds the above upper limit, the yield of the resin becomes extremely low and the softening point of the resin disadvantageously decreases.

The hydrocarbon resins (I) prepared hereinabove are then reacted with the unsaturated carboxylic acid or the anhydride thereof (Component C). The Component C is preferably a mono- or poly-unsaturated carboxylic acid or an anhydride thereof having generally 3 to 32 carbon atoms, and preferably 3 to 15 carbon atoms. Representatives are: acrylic acid, methacrylic acid, maleic acid, maleic anhydride, tetrahydrophthalic acid and its anhydride, fumaric acid, citraconic acid, itaconic acid, mixtures thereof, and fatty acids of drying oils, for example a fatty acid of linseed oil or the like. Among these, maleic acid and maleic anhydride are preferred.

The amounts of the unsaturated carboxylic acid or the anhydride thereof to be employed in the present invention is 1 to 15 parts by weight, and preferably 1 to 10 parts by weight with respect to 100 parts by weight of the hydrocarbon resin (I). When the amount of the unsaturated carboxylic acid or the anhydride thereof is below the lower limit, it is not desirable because of poor characteristics which result from a low amount of polar groups in the formed resin and because of low dispersibility in pigments, reduced flowability of ink, and degraded printing effect when used as a vehicle for ink.

When the amount of the unsaturated carboxylic acid or its anhydride exceeds the upper limit, it also is not preferred because the amount of the polar groups is too high so that the solubility in solvents is decreased, and discoloration of the resin and gelation tend to occur. When this is used in an ink, it is not preferred because the solubility in a hydrocarbon solvent upon varnishing is decreased, and the flowability of ink and gloss on the printed surface are lessened.

The above reaction for modification may be carried out without a catalyst or in the presence of a known radical initiator such as an organic peroxide or the like at a temperature ranging from 100° to 300° C., preferably from 150 to 250° C., for 30 minutes to 15 hours, preferably from 1 to 8 hours. It is preferred to carry out the reaction without a catalyst when an unsaturated polycarboxylic acid or the anhydride thereof is used, and with a catalyst when an unsaturated monocarboxylic acid or the anhydride thereof is used.

The acid-modified resins to be used in the present invention may also be prepared by the following one-step process: In thermally polymerizing a mixture of Component A and Component B in the presence or absence of a solvent at 200° to 300° C., the unsaturated carboxylic acid or the anhydride thereof is added to the reaction system at the beginning of or during the reaction and subjected to thermal polymerization.

In accordance with the present invention, the acid-modified resin (II) may be esterified with an alcohol in order to control the solubility and the softening point of the acid-modified resin (II) or to regulate the molecular weight of the resin (III). The alcohol to be used in this case may include a mono- or poly-hydric alcohol. When a monohydric alcohol having 6 or more carbon atoms, and preferably from 8 to 18 carbon atoms, is employed, the particularly preferred solubility of the modified resin (III) may be achieved. The amount of the alcohol may be from 0 to 1.0 molar equivalent with respect to the equimolar equivalent of the carboxyl groups in the acid-modified resin (II) or from 0 to 2.0 molar equivalents with respect to the equimolar equivalent of the acid anhydride groups in the resin (II). The esterification may be effected by heat-melting the acid-modified resin and then adding the alcohol, or by dissolving the acid-modified resin in a hydrocarbon solvent such as benzene, toluene, xylene or the like and adding the alcohol. The reaction may be carried out for 30 minutes to 10 hours, and preferably from 1 to 5 hours, at a temperature of 150° to 250° C.

In accordance with the present invention, the acid-modified resin (II) is further reacted with the phenol resin (Component D) to provide the desired modified resin (III). The phenol resin to be employed in the present invention is preferably one which may be prepared by condensation of a phenol having an alkyl substituent wih 4 to 9 carbon atoms and formalin, and may include specifically p-tert-butylphenol, sec-butylphenol, p-tert-octylphenol, nonylphenol or the like, which is preferable for industrial use.

Instead of the reaction with the phenol resin, the desired phenol resin modified resins may be prepared by reacting formaldehyde and a phenol in the presence of the acid-modified resin (II) and in the presence or absence of a catalyst such as oxalic acid, maleic acid or the like.

The amount of the phenol resin to be used for modification may range from 5 to 100 parts by weight, preferably from 10 to 50 parts by weight, of the phenol resin with respect to 100 parts by weight of the acid-modified resin (II). When the amount of the phenol resin is below the stated lower limit, an ink using this modified resin as a vehicle cannot provide sufficient flowability or an appropriate gloss on printed surfaces. When the amount of the phenol resin exceeds the stated upper limit, it is not preferred because the solubility of the resin in an ink solvent is decreased; it is not industrially desirable and it is not economical.

This reaction proceeds merely by melting a mixture of the acid-modified resin (II) and the phenol resin at 150° to 250° C. for 30 minutes to 10 hours, preferably from 1 to 5 hours. If necessary, an acid catalyst such as oxalic acid, toluenesulfonic acid, a Friedel-Crafts catalyst or the like may be employed.

The resin (III) as prepared hereinabove preferably has a softening point of 100° C. or higher, more preferably 130° C. or higher. When the softening point is lower than 100° C., it is not desirable because, when used in an ink for printing, the phenomenon of misting tends to occur frequently, the time required for drying is extremely prolonged, and blocking tends to occur.

The resin (III) preferably has an acid value of 5 to 50, and more preferably 5 to 20. Where the acid value is below the lower value, the ink resulting therefrom has poor flowability. A resin having an acid value above the upper limit has lessened solubility in paraffinic solvents and, when included in an ink for offset printing, the inks resistance to emulsion is so degraded that it is not desirable.

The resin (III) as prepared hereinabove may be employed as a vehicle to prepare an offset ink composition in accordance with the present invention by usual, known and arbitrary methods. The ink composition in accordance with the present invention may be prepared by dissolving 100 parts by weight of the resin (III) in 50 to 200 parts by weight of a high boiling point paraffinic solvent and 0 to 150 parts by weight, preferably from 5 to 30 parts by weight, of a drying oil at ambient or elevated temperatures to provide a varnish adjusted to have a viscosity between 200 and 600 poises at ordinary temperature; formulating a pigment or the like therewith; and mixing and kneading by means of a roll mixer or the like.

The high boiling point paraffinic solvent to be used in the present invention may be one having a boiling point between 200° and 350° C. and having substantially no aromatic component, although usual high boiling point hydrocarbon solvents having an aromatic component of 50% or less may be used. The oil component such as the drying oil or the like may also include a long oil type alkyd resin as well as linseed oil, tung oil or the like.

The following examples illustrate specifically the present invention, but should only be construed as illustrating a few examples. Accordingly, the present invention is not restricted to the examples as long as it does not deviate from the spirit and scope of the present invention.

SYNTHESIS EXAMPLE 1

Dicyclopentadiene (DCPD) of 97% purity (580 grams), 350 grams of tetrahydroindene (THI) and 70 grams of methyltetrahydroindene (MeTHI) were charged into a 2 liter autoclave, and the mixture was heated and stirred at 260° C. for 5 hours in a nitrogen atmosphere. After completion of the reaction, the autoclave was cooled and subjected to distillation at a temperature of 210° C. and a pressure of 2 mmHg to distill off the unreacted and low molecular weight materials, thereby leaving as a residual material 810 grams of a hydrocarbon resin (I-1). This resin had a softening point of 150.0° C.

This hydrocarbon resin (I-1) (100 grams) was heat-melted at 200° C. and, after the addition thereto of 3.0 grams of maleic acid anhydride, stirred for 4 hours to provide an acid-modified resin (II-1) having a softening point of 161.0° C. and an acid value of 13.0. The acid-modified resin (II-1) (103.0 grams) was then mixed with 18.2 grams of a resol type phenol resin obtainable by the condensation reaction of p-tert-octylphenol and formalin, and the mixture was heated at 195° C. for 2 hours to provide a modified resin (III-1) having a softening point of 180.0° C. and an acid value of 12.0.

SYNTHESIS EXAMPLE 2

DCPD of 97% purity (500 grams), 400 grams of vinylnorbornene (VNB) and 100 grams of vinylcyclohexene (VCH) were charged into a 2 liter autoclave, subjected to reaction at 260° C. for 4 hours, and treated in the same manner as in Synthesis Example 1 to provide 750 grams of a hydrocarbon resin (I-2) having a softening point of 143.0° C.

The hydrocarbon resin (I-2) (100 grams) was heat-melted at 200° C. and, after the addition of 4.0 grams of maleic anhydride, stirred for 3 hours to provide an acid-modified resin (II-2) having a softening point of 158.0° C. and an acid value of 18. The acid-modified resin (II-2) (104.0 grams) was then mixed with 18.4 grams of a resol type phenol resin prepared by the condensation reaction of p-tert-butylphenol and formalin, and the mixture was then reacted at 190° C. for 3 hours to provide a modified resin (II-2) having a softening point of 175.0° C. and an acid value of 15.0.

SYNTHESIS EXAMPLE 3

DCPD of 97% purity (450 grams), 300 grams of THI, 150 grams of VNB and 100 grams of MeTHI were charged into a 2 liter autoclave, reacted at 270° C. for 3 hours, and then treated in the same manner as in Synthesis Example 1 to provide 730 grams of a hydrocarbon resin (I-3) having a softening point of 145.0° C.

The hydrocarbon resin (I-3) (100 grams) was heat-melted at 200° C. and, after the addition thereto of 5.0 grams of maleic anhydride, stirred for 3 hours to provide an acid-modified resin (II-3) having a softening point of 160.0° C. and an acid value of 22.0. The acid-modified resin (II-3) (105.0 grams) was stirred at 180° C. for 1 hour after the addition of 4.0 grams of decanol and then reacted with 16.3 grams of a resol type phenol resin prepared by the condensation of p-nonylphenol and formalin, thereby providing a modified resin (III-3) having softening point of 165.0° C. and an acid value of 19.0.

SYNTHESIS EXAMPLE 4

DCPD of 97% purity (600 grams) and 400 grams of THI were charged into a 2 liter autoclave, reacted at 260° C. for 6 hours, and then treated in the same manner as in Synthesis Example 1 to provide 800 grams of a hydrocarbon resin (I-4) having a softening point of 151.0° C.

The hydrocarbon resin (I-4) (100 grams) was then heat-melted at 200° C. and, after the addition of 4.0 grams of maleic anhydride, stirred for 3 hours to provide an acid-modified resin (II-4) having a softening point of 162.0° C. and an acid value of 17.0. Then, 104.0 grams of the acid-modified resin (II-4) were mixed with 22.9 grams of a resol type phenol resin prepared by the condensation of p-tert-butylphenol and formalin, and the mixture was reacted at 190° C. for 2 hours to provide a modified resin (III-4) having a softening point of 178.0° C. and an acid value of 15.0.

SYNTHESIS EXAMPLE 5

$C_5$ cracked oil fractions (boiling points, 28°–60° C.), prepared as by-products in the manufacture of ethylene, propylene or the like by the steam cracking of naphtha were subjected to distillation at 120° C. for 4 hours to remove the $C_5$ fractions, thereby leaving a residual material containing 85% DCPD and, as other components, codimers of cyclopentadiene with isoprene or piperylene. Then 650 grams of the fractions containing 85% DCPD and 450 grams of VNB were charged into a 2 liter autoclave, reacted at 270° C. for 3 hours, and then treated in the same manner as in Synthesis Example 1 to produce 850 grams of a hydrocarbon resin (I-5) having a softening point of 155.0° C. Then 100 grams of the hydrocarbon resin (I-5) were heat-melted at 200° C., mixed with 4.0 grams maleic acid anhydride, and stirred for 4 hours to provide an acid-modified resin (II-5) having a softening point of 165.0° C. and an acid value of 18.0. The acid-modified resin (104.0 grams) was then mixed with 3.5 grams of 2-ethylhexanol and stirred at 180° C. for 1 hour, followed by the addition thereto of 17.0 grams of a resol type phenol resin prepared by the condensation of p-tert-octylphenol and formalin. The mixture was reacted at 190° C. for 3 hours, thereby providing a modified resin (III-5) having a softening point of 175.0° C. and an acid value of 15.0.

COMPARATIVE SYNTHESIS EXAMPLE 1

DCPD of 95% purity (1,000 grams) and 400 grams of xylene as a solvent were charged into a 2 liter autoclave, reacted at 260° C. for 3 hours, and treated in the same manner as in Synthesis Example 1 to provide 800 grams of a hydrocarbon resin (I-a) having a softening point of 152.0° C.

The hydrocarbon resin (I-a) (100 grams) was heat-melted at 200° C., mixed with 3.0 grams of maleic anhydride, and treated for 4 hours to provide an acid-modified resin (II-a) having a softening point of 162.0° C. and an acid value of 13.0. The acid-modified resin (II-a) (103.0 grams) was then mixed with 18.2 grams of a resol type phenol resin prepared by the condensation of p-tert-octylphenol and formalin and reacted at 195° C. for 2 hours, thereby producing a resin (III-a) having a softening point of 178.0° C. and an acid value of 12.0.

COMPARATIVE SYNTHESIS EXAMPLE 2

The hydrocarbon resin (I-1) (100 grams) obtained in Synthesis Example 1 was heat-melted at 190° C., mixed with 15.0 grams of a resol type phenol resin prepared by the condensation of p-tert-octylphenol and formalin, then reacted with stirring at 190° C. for 2 hours to provide a resin (III-b) having a softening point of 155.0° C. and an acid value of 0.

EXAMPLES 1-5 AND COMPARATIVE EXAMPLES 1-4

The modified resins obtained in the above Synthesis Examples 1–5, Comparative Synthesis Examples 1 and 2, the acid-modified resin (II-1) obtained in Synthesis Example 1, and a control resin, respectively, were formulated as described below to prepare a varnish. Each of the varnishes so prepared was then included in an ink which was tested for ink performance. The test results are shown in the table below as Examples 1–5 and Comparative Examples 1–4, respectively.

(PREPARATION OF VARNISHES)

A mixture of 50 grams of the product resin, 10 grams of linseed oil and 20–40 grams of a high boiling point paraffinic solvent (NISSEKI No. 0 Solvent H: product of Nippon Oil Company Ltd., boiling point, 250°–265° C.; a pure aliphatic hydrocarbon solvent containing no aromatic components) was heat-melted at 180° C. to provide a varnish having a viscosity of 300 to 400 poises.

(PREPARATION OF INKS)

An ink was formulated by mixing the following by means of three rolls.

| | |
|---|---|
| Pigment (trademark "Karmin 6B: product of Toyo Ink Seizo K.K.) | 14 grams |
| Varnish | 50 grams |
| Solvent (Nisseki No. 0 Solvent H) | 15 grams |

(PERFORMANCE TEST METHOD AND RESULTS)

Gloss: 0.4 cc of the ink was applied to a coated paper by means of an RI tester (manufactured by Akira Seisakusho K.K.), dried for 10 seconds in an oven at 150° C., and then measured with a 60°—60° glossmeter.

Drying Time: 0.4 cc of the ink was applied to a parchment paper with said RI tester, placed in an oven heated to 150° C. and measured for the time required to lose stickiness perceivable by finger touch.

Misting: 2.4 cc of the ink was placed on an incometer (manufactured by Toyo Seiki K.K.), rotated at 1,200 r.p.m. for 3 minutes, and measured for the degree of scattering on a coated paper placed under the roll.

Emulsification characteristics of ink: Water was added to the adjusted ink to emulsify the ink, and the ink was measured for its flowability. An ink for offset printing is not practical if the emulsified ink does not have good flowability because the ink is brought into contact with water during printing and is partially emulsified.

| | Type of Resins | Viscosity of Varnish (poises 25° C.) | Physical Appearance of Varnish | Gloss on Printed Surface | Drying Period (sec) | Misting | Emulsification Characteristics of Ink |
|---|---|---|---|---|---|---|---|
| Example 1 | III - 1 (Synthesis Example 1) | 410 | Transparent | 65 | 5 | Did not occur | Favorable |
| Example 2 | III - 2 (Synthesis Example 2) | 350 | Transparent | 68 | 6 | Did not occur | Favorable |
| Example 3 | III - 3 (Synthesis Example 3) | 330 | Transparent | 70 | 8 | Did not occur | Favorable |
| Example 4 | III - 4 (Synthesis Example 4) | 370 | Transparent | 68 | 6 | Did not occur | Favorable |
| Example 5 | III - 5 (Synthesis Example 5) | 360 | Transparent | 70 | 7 | Did not occur | Favorable |
| Comparative Example 1 | III - a (Comparative Synthesis Example 1) | No ink was prepared because a transparent varnish was not obtained due to poor solubility of the resin in paraffinic solvents. | | | | | |
| Comparative Example 2 | III - b (Comparative Synthesis Example 2) | 250 | Turbid Bad hue | 55 | 20 | Occurred | Not Good |
| Comparative Example 3 | II - 1 (Synthesis Example 1) | 180 | Turbid | 40 | 15 | Occurred | Not Good |
| Comparative Example 4 | (Control Resin*) | 370 | Transparent | 66 | 7 | Did not Occur | Slightly inferior |

*Rosin-modified phenol resin (Trademark Tamanol 361: Arakawa Kagaku K.K.)

As shown in Examples 1 to 5 according to the present invention, it is apparent that the offset ink compositions in accordance with the present invention have excellent gloss and emulsification characteristics, and favorable misting and drying performance when a paraffinic solvent is used.

It is shown from Comparative Example 1 that a uniform ink cannot be obtained with a resin containing no codimer of cyclopentadiene and 1,3-butadiene because of poor solubility.

Comparative Example 2 represents an example in which the resin is not acid-modified during the step of modification. This resin cannot provide a complete reaction with the phenol resin. Thus, it produces no resin having a high softening point, and an ink prepared therefrom was poor in both drying and emulsifying characteristics.

It is shown from Comparative Example 3, which represents an example in which no modification with a phenol resin is effected, that such a resin is not practically applicable because of its poor gloss, and drying and emulsifying characteristics.

As a control, an ink was prepared by using a rosin-modified phenol resin having excellent solubility in paraffinic solvents. This was compared with the examples according to the present invention. As a result, it is shown that the offset ink composition according to the present invention are superior in emulsification performance to the ink prepared from the rosin-modified phenol resin.

What is claimed is:

1. An offset ink composition comprising as a vehicle a resin which is the reaction product of 5-100 parts per hundred by weight of a phenol-formaldehyde resin and an acid modified resin, the acid modified resin being the reaction product of 1-15 parts per hundred by weight of an unsaturated carboxylic acid or anhydride thereof and a hydrocarbon resin, the hydrocarbon resin being the copolymerization product of a 5-membered ring compound having a conjugated doubled bond of the formula.

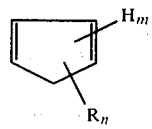

in which R is an alkyl group having 1 to 3 carbon atoms and m and n are 0 or a positive integer which together total 6 and/or a Diels-Alder addition product thereof and 10-150 parts per hundred by weight of a codimer of the 5-membered ring compound and 1,3-butadiene.

2. An offset ink composition as claimed in claim 1, wherein the amount of codimer is 20 to 100 parts per hundred by weight.

3. An offset ink composition as claimed in claim 1 or 2, wherein the ring compound is cyclopentadiene, methylcyclopentadiene, dicyclopentadiene, cyclopentadiene-methylcyclopentadiene codimer or tricyclopentadiene.

4. An offset ink composition as claimed in claim 1 or 2, wherein the ring compound further contains an unsaturated component of a petroleum fraction in an amount of not more than the equimolar equivalent of the five-membered ring compound and/or the Diels-Alder addition product thereof.

5. An offset ink composition as claimed in claim 4, wherein the unsaturated component is styrene, α-methylstyrene, vinyltoluene, indene, methylindene or a mixture thereof.

6. An offset ink composition as claimed in claim 1 or 2, wherein the codimer is a codimer of cyclopentadiene and 1,3-butadiene.

7. An offset ink composition as claimed in claim 6, wherein the codimer is tetrahydroindene, vinylnorbornene, a substituted derivative thereof or a mixture thereof.

8. An offset ink composition as claimed in claim 1, wherein the amount of acid or anhydride is 1 to 10 parts per hundred by weight.

9. An offset ink composition as claimed in claim 1 or 8, wherein the acid or anhydride is an unsaturated mono- or poly-carboxylic acid or an anhydride thereof having 3 to 32 carbon atoms.

10. An offset ink composition as claimed in claim 9, wherein the unsaturated mono- or poly-carboxylic acid or the anhydride thereof has 3 to 15 carbon atoms.

11. An offset ink composition as claimed in claim 9, wherein the acid or anhydride is acrylic acid, methacrylic acid, maleic acid, maleic anhydride, tetrahydrophthalic acid, tetrahydrophthalic acid anhydride, fumaric acid, citraconic acid, itaconic acid, a mixture thereof, or a fatty acid of a drying oil.

12. An offset ink composition as claimed in claim 1 or 8, wherein the acid-modified resin was prepared by reacting the hydrocarbon resin with the acid or anhydride at 100° to 300° C.

13. An offset ink composition as claimed in claim 1 or 8, wherein the acid-modified resin is esterified with an alcohol.

14. An offset ink composition as claimed in claim 13, wherein the alcohol is a mono- or poly-hydric alcohol.

15. An offset ink composition as claimed in claim 14, wherein the alcohol is a mono-hydric alcohol having 6 to 18 carbon atoms.

16. An offset ink composition as claimed in claim 1, wherein the amount of phenol-formaldehyde resin is 10 to 50 parts per hundred by weight.

17. An offset ink composition as claimed in claim 1 or 16, wherein the resin has a softening point of 100° C. or higher.

18. An offset ink composition as claimed in claim 1 or 16, wherein the resin has an acid value between 5 and 50, inclusive.

19. An offset ink composition comprising as varnish:
(a) 100 parts by weight of a vehicle comprising a resin which is the reaction product of 5–100 parts per hundred by weight of a phenol-formaldehyde resin and an acid modified resin, the acid modified resin being the reaction product of 1–15 parts per hundred by weight of an unsaturated carboxylic acid or anhydride thereof and a hydrocarbon resin, the hydrocarbon resin being the copolymerization product of a 5-membered ring compound having a conjugated double bond of the formula

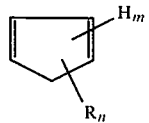

in which R is an alkyl group having 1 to 3 carbon atoms and m and n are 0 or a positive integer which together total 6 and/or a Diels-Alder addition product thereof and 10–150 parts per hundred by weight of a codimer of the 5-membered ring compound and 1,3-butadiene;
(b) 50–200 parts by weight of a high boiling point parafinic solvent; and
(c) 0–150 parts of a drying oil.

20. An offset ink composition as claimed in claim 19, wherein the amount of codimer is 20 to 100 parts per hundred by weight.

21. An offset ink composition as claimed in claim 1 or 20, wherein the ring compound is cyclopentadiene, methylcyclopentadiene, dicyclopentadiene, cyclopentadiene-methylcyclopentadiene codimer or tricyclopentadiene.

22. An offset ink composition as claimed in claim 1 or 20, wherein the ring compound further contains an unsaturated component of a petroleum fraction in an amount of not more than the equimolar equivalent of the five-membered ring compound and/or the Diels-Alder addition product thereof.

23. An offset ink composition as claimed in claim 22, wherein the unsaturated component is styrene, α-methylstyrene, vinyltoluene, indene, methylindene, or a mixture thereof.

24. An offset ink composition as claimed in claim 23, wherein the codimer is tetrahydroindene, vinylnorbornene, a substituted derivative thereof or a mixture thereof.

25. An offset ink composition as claimed in claim 19, wherein the amount of acid or anhydride is 1 to 10 parts per hundred by weight.

26. An offset ink composition as claimed in claim 19 or 25, wherein the acid or anhydride is an unsaturated mono- or polycarboxylic acid or an anhydride thereof having 3 to 32 carbon atoms.

27. An offset ink composition as claimed in claim 26, wherein the unsaturated mono- or poly-carboxylic acid or the anhydride thereof has 3 to 15 carbon atoms.

28. An offset ink composition as claimed in claim 26, wherein the acid or anhydride is acrylic acid, methacrylic acid, maleic acid, maleic anhydride, tetrahydrophthalic acid, tetrahydrophthalic acid anhydride, fumaric acid, citraconic acid, itaconic acid, a mixture of these or a fatty acid of drying oil.

29. An offset ink composition as claimed in claim 19 or 25, wherein the acid-modified resin was prepared by reacting the hydrocarbon resin with the acid or anhydride at 100° to 300° C.

30. An offset ink composition as claimed in claim 1 or 25, wherein the acid-modified resin is esterified with an alcohol.

31. An offset ink composition as claimed in claim 30, wherein the alcohol is a mono- or poly-hydric alcohol.

32. An offset ink composition as claimed in claim 31, wherein the alcohol is a mono-hydric alcohol having 6 to 18 carbon atoms.

33. An offset ink composition as claimed in claim 19, wherein the amount of phenol-formaldehyde is 10 to 50 parts per hundred by weight.

34. An offset ink composition as claimed in claim 19 or 33, wherein the resin has a softening point of 100° C. or higher.

35. An offset ink composition as claimed in claim 34, wherein the resin has a softening point of 130° C. or higher.

36. An offset ink composition as claimed in claim 19 or 33, wherein the resin has an acid value between 5 and 50, inclusive.

37. An offset ink composition as claimed in claim 19, wherein the high boiling paraffinic solvent has a boiling point between 200° and 350° C. and has an aromatic component content of 0 to 50% by weight.

38. An offset ink composition as claimed in claim 19, wherein the drying oil is included in the amount of 5 to 30 parts by weight.

39. An offset ink composition as claimed in claim 19 or 38, wherein the drying oil is linseed oil, tung oil or a long oil type alkyd resin.

40. An ink composition comprising an offset ink composition as claimed in claim 19 and a pigment.

41. An offset ink composition as claimed in claim 19 or 20, wherein the codimer is a codimer of cyclopentadiene and 1,3-butadiene.

42. An ink composition as claimed in claim 40, wherein the resin has a softening point of at least 130° C. and an acid value between 5 and 50, the amount of codimer is 20-100 parts per hundred by weight, the acid or anhydride has 3-15 carbon atoms and is 1-10 parts per hundred by weight, the amount of the phenol-formaldehyde resin is 10-50 parts per hundred by weight, the amount of drying oil is 5-30 parts by weight and wherein the vehicle has a viscosity between 200 and 600 poises.

* * * * *